April 15, 1969     C. E. MARTIN     3,438,880

ELECTROLYTIC METHOD OF SHARPENING THE EDGE OF A METAL MEMBER

Filed Dec. 14, 1965

INVENTOR
COLIN EDWARD MARTIN

BY

Wolfe, Hubbard, Voit & Osann
ATTORNEY

United States Patent Office 3,438,880
Patented Apr. 15, 1969

3,438,880
ELECTROLYTIC METHOD OF SHARPENING THE EDGE OF A METAL MEMBER
Colin E. Martin, Windsor, England, assignor to Wilkinson Sword Limited, London, England, a British company
Filed Dec. 14, 1965, Ser. No. 513,681
Int. Cl. C23b 3/04
U.S. Cl. 204—142    11 Claims

ABSTRACT OF THE DISCLOSURE

A method of electroforming or electrofinishing the cutting edge of a metal member, comprises placing the metal member with a first portion in electrolyte which is in contact with a first electrode and with a second portion in electrolyte which is in contact with a second electrode, the electrolyte in contact with the first electrode being isolated from the electrolyte in contact with the second electrode, and applying an electrical potential difference between the first electrode and the second electrode whereby an electric current passes between the two electrodes. The path for the current is from that electrode which is at the higher positive potential through the electrolyte contacting that electrode and thence to the metal member, through the metal member to the electrolyte contacting the electrode which is at the less positive potential and thence to the latter electrode. The current density in the region of the metal member at which current leaves the metal member is substantially greater than the current density in the region at which current enters.

---

This invention relates to the production of cutting edges and whilst relating particularly to the production of the cutting edges of razor blades is not limited thereto.

More particularly, the invention employs electrolytic processing in the production of cutting edges. The electrolytic processes may be used for the finishing, only, of cutting edges after initial formation by other methods, such as abrasive methods, and such processing will be referred to hereafter as "electro-finishing". On the other hand, the processing may be used for production of a cutting edge, without prior mechanical shaping, in which case such processing will be referred to hereafter as "electro-forming".

According to the present invention there is provided a method of electrolytically processing a metal member to form, at least partly, a cutting edge thereon, wherein there is no physical contact between said metal member and the anode or cathode between which the processing current flows.

The invention also provides a method of electrolytically processing a metal member to form, at least partly, a cutting edge thereon, wherein the electrolyte in contact with the cathode is substantially isolated from the electrolyte in contact with the anode, the current flow between the two electrolytes being substantially wholly through said metal member.

The invention further provides apparatus for electrolytically processing a metal member to form, at least partly, a cutting edge thereon, comprisng an anode, a cathode, means for containing electrolyte in contact with said anode and said cathode, means for isolating the electrolyte in contact with said anode from the electrolyte in contact with said cathode and means for supporting said metal member so that it is in physical contact with both the anode contacting electrolyte and the cathode contacting electrolyte.

The methods of electrolytically processing metal members, and apparatus therefor, will now be described by way of example with reference to the accompanying drawings. The methods and apparatus will be described in respect of their application to the formation or finishing of the cutting edges of razor blades, but it is to be understood that the invention is not limited to this application.

Figure 1:
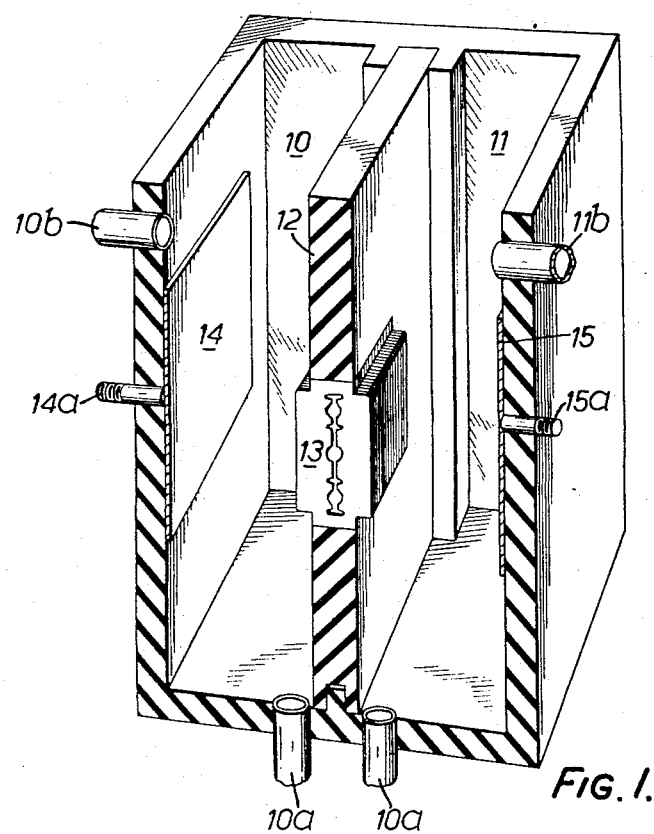

In the drawings:
FIGURE 1 is a sectional perspective view of one form of apparatus as mentioned above, whilst
FIGURE 2 is a sectional side elevation of the second form of apparatus.

Referring now to FIGURE 1, in this form of apparatus there are virtually two electrolytic processing cells 10, 11, and conveniently these have a common partition wall 12 separating the two cells 10, 11. A stack of razor blade blanks 13 having unformed or partly formed cutting edges is so positioned in an aperture in the wall 12 that it constitutes an electrically conductive path between the electrolyte (not shown) in the two cells 10, 11. Whilst individual blade blanks could be treated in this way it is clearly more economical to treat a number of blade blanks simultaneously, for example by stacking individual blanks together or by processing the material in strip form prior to its formation into individual blades. If the electrolytic processing is to be limited to electrofinishing, the strip will previously have been subjected to partial edge formation by mechanical or other methods.

A single electrode 14, 15 is positioned in each cell 10, 11 respectively, within the electrolyte. Typical electrolyte compositions are a mixture of phosphoric acid and chromic acid, phosphoric acid and glycerol or phosphoric acid and glycerol with a small amount of citric acid, with or without the addition of water. Additives can be used to control the conductivity of the electrolyte, to facilitate wetting and the removal of gas bubbles, to reduce evolution of gas, to inhibit decomposition of the electrolyte and to produce a more corrosion resistant finish.

It is an important feature of the present invention that the electrolytic processing is effected without making direct electrical connection to the metal to be processed. This may be achieved by connecting the terminals 14a, 15a of the electrodes 14, 15 to a source of alternating current or to a source of direct current whose polarity is reversed periodically. At any given time the direction of current flow is from that one of the electrodes which is then positive, through the electrolyte in which that electrode is immersed, thence through the blade blanks 13 being processed and through the electrolyte in the second cell to the other electrode which is at that time neagtive. In this way there is anodic reduction of each edge of the blade blanks 13 in turn when the respective edge is positive relative to the adjacent electrode.

It will be seen that no direct electrical connection to the blade blanks 13 is required and this facilitates production and aids uniformity of processing.

With some metals the current density required is such that difficulties arise due to excessive gas formation at the surfaces being processed, and in such cases direct current may be used with periodic reversal of current flow. The reversal frequency will be substantially less than that of a mains alternating supply and will normally be only a few cycles per minute, the process being continued with periodic reversals of the current until the desired degree of removal of metal has been achieved.

Under some circumstances discolouration of the blade may occur on that edge which acts as a cathode during the last period of current flow. Such discolouration can be reduced by progressive reduction of the current periods, that is by progressively increasing the frequency of reversal, prior to completion of the process. For example, the frequency of reversal can be increased up to the order of one reversal per second or even up to mains frequency, that is 100 reversals per second.

Another way of achieving this effect is to ensure that the blade edge which is negative to the adjacent electrode at any given time is only subject to low current density during that time, without reduction of the current density during the periods when the edge is positive with respect to that electrode. One way of achieving this is to use a metal for part or all of the partition wall 12, the metal being such that when the surface in one cell is anodic relative to the electrode 14 or 15 in that cell an oxide film is produced temporarily on that wall surface, which film has a rectifying action so that the current passing through this part of the partition wall will fall to a low value. On the other hand there will be no such film on the other surface of the wall, because it is at that time cathodic to its adjacent electrode, which will therefore be a good conductor. When the polarity reversal occurs the conductivity of the wall surfaces will be reversed. The result of this is that when the blade surface is negative the majority of the current enters the metallic part of the partition wall 12 because of its larger surface area relative to the surface area of the blade blanks 13, but the current flow into the adjacent cell is concentrated at the surface of the blade blanks 13 being treated due to the oxide film on the surface of the partition wall 12 in that cell. Suitable metals for this purpose are titanium, niobium, tantalum, tungsten, zirconium and, possibly, aluminum. The period between reversals must be sufficiently long to allow formation of the oxide film which must of course be insoluble in the electrolyte and the area of the metallic part of the partition wall 12 relative to the area of the blade blanks 13 must be appropriate.

When metal is used for at least part of the partition wall 12 repeated reversal of the current is not essential and if a double cutting edge is being formed one edge can be completely formed first of all and the current then reversed to process the other edge.

In order that high current densities may be used to obtain a fast processing rate there may be a continuous flow of electrolyte through the cells through inlets 10a, 11a and outlets 10b, 11b respectively. In order to reduce gassing the electrolyte may be under high pressure. Degassing can be effected at a reservoir from which the electrolyte is recirculated.

For complete electro-forming the gap between each electrode 14, 15 and the adjacent surface of the blade blanks 13 will be relatively small or the edges of the blade blanks 13 may be masked to achieve the desired edge contour.

A number of interchangeable partition walls 12 may be provided so that when one is withdrawn for the blade blanks to be removed it can be replaced with another wall already loaded with a stack of blades for further treatment. In this way the period between processing can be reduced to a minimum.

Figure 2:
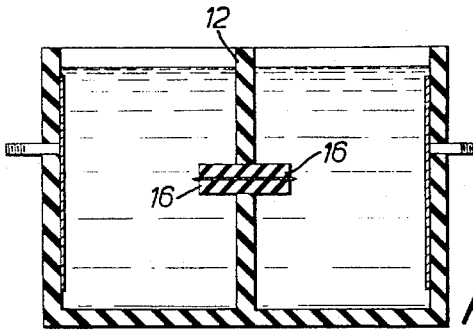

Referring now to FIGURE 2, this shows how the cell of FIGURE 1 may be modified for the treatment of blades in strip form, by providing guides 16 located in the partition wall 12 between which guides 16 the strip is supported. The strip may be stationary or moving during processing and in the latter case the movement can be intermittent. The guides 16 can also act as masks to minimise the area on which diminution can be effected.

What I claim is:

1. The method of electrolytically sharpening the edge of a metal member to form, at least partly, a cutting edge thereon, comprising
    placing the metal member with a first portion in electrolyte which is in contact with a first electrode and with a second portion in electrolyte which is in contact with a second electrode,
    isolating the electrolyte in contact with the first electrode from the electrolyte in contact with the second electrode by a dividing wall which has electrolyte contacting surfaces of a metal such that when a surface is at anodic potential the current passing therethrough is substantially less than when the surface is at cathodic potential, and
    applying an electrical potential difference between said first electrode and said second electrode whereby an electric current passes from the electrode of higher positive potential only to the electrolyte in contact therewith and thence to said wall and said metal member, through said metal member only to the electrolyte contacting said other electrode and thence to said latter electrode, thereby making said metal member function as a bipolar electrode and wherein the current density is greater on the side of said metal member functioning as an anode than on the side of said metal member functioning as a cathode.

2. The method according to claim 1, wherein said potential difference is an alternating one.

3. The method according to claim 1, wherein the potential difference between said first and second electrodes is periodically reversed in polarity.

4. The method according to claim 3, wherein a cutting edge is formed on each of two edges of said member, one being formed during the periods of current flow in one direction and the other being formed during the periods of current flow in the reverse direction.

5. The method according to claim 3, wherein the frequency of polarity reversal is increased during the final stage of processing.

6. The method according to claim 1, wherein the metal member is a strip of razor blade material.

7. The method according to claim 1, wherein the metal member is a razor blade blank.

8. The method according to claim 7, comprising stacking a number of razor blade blanks one on top of the other for processing.

9. The method according to claim 1, wherein the metal member is progressively moved through the electrolyte during processing.

10. The method according to claim 1 wherein the metal member is of stainless steel.

11. The method according to claim 1, wherein the metal member is a nickel-chromium alloy.

References Cited

UNITED STATES PATENTS 3,338,807    8/1967    Clifford _____ 204—143

FOREIGN PATENTS 203,441    9/1923    Great Britain.

ROBERT K. MIHALEK, *Primary Examiner.*

U.S. Cl. X.R.

204—254, 279, 286